(12) United States Patent
Melnikov

(10) Patent No.: US 10,357,855 B2
(45) Date of Patent: Jul. 23, 2019

(54) METHOD FOR TIGHTENING A THREAD JOINT

(71) Applicant: Mikhail Borisovich Melnikov, Snehinsk (RU)

(72) Inventor: Mikhail Borisovich Melnikov, Snehinsk (RU)

( * ) Notice: Subject to any disclaimer, the term of this patent is extended or adjusted under 35 U.S.C. 154(b) by 0 days.

(21) Appl. No.: 15/606,116

(22) Filed: May 26, 2017

(65) Prior Publication Data
US 2018/0281132 A1 Oct. 4, 2018

(30) Foreign Application Priority Data
Mar. 28, 2017 (EP) ...................... 17163298

(51) Int. Cl.
| | | |
|---|---|---|
| F16B 5/02 | (2006.01) | |
| B23P 19/06 | (2006.01) | |
| F16B 25/00 | (2006.01) | |
| F16B 33/02 | (2006.01) | |
| F16B 31/04 | (2006.01) | |
| F16D 1/00 | (2006.01) | |
| F16B 33/04 | (2006.01) | |
| E21B 19/16 | (2006.01) | |

(52) U.S. Cl.
CPC .......... B23P 19/061 (2013.01); F16B 5/0275 (2013.01); F16B 25/0057 (2013.01); F16B 25/0073 (2013.01); F16B 31/04 (2013.01); F16B 33/02 (2013.01); F16D 1/00 (2013.01); B23P 2700/11 (2013.01); E21B 19/16 (2013.01); F16B 2033/04 (2013.01); Y10T 29/49948 (2015.01); Y10T 29/49963 (2015.01)

(58) Field of Classification Search
CPC .............. B23P 19/061; Y10T 29/9948; Y10T 29/49963; F16B 5/0275; F16B 25/0073; F16B 25/0057
USPC .................................................. 411/389, 413
See application file for complete search history.

(56) References Cited

U.S. PATENT DOCUMENTS

| | | | | |
|---|---|---|---|---|
| 2,485,280 A | * | 10/1949 | Grace ...................... | F16B 33/02 254/98 |
| 3,402,613 A | * | 9/1968 | Neusel ................... | G05G 23/00 248/479 |
| 3,897,112 A | * | 7/1975 | Walther .................. | B60B 23/10 301/11.1 |
| 3,960,047 A | * | 6/1976 | Liffick ...................... | B60B 3/16 411/429 |

(Continued)

*Primary Examiner* — Jermie E Cozart
(74) *Attorney, Agent, or Firm* — The Roy Gross Law Firm, LLC; Roy Gross

(57) ABSTRACT

A method for tightening a thread joint of a base part with a small thread pitch and a part to be attached with a large thread pitch by rotation in screw-in direction of a differential thread connector, including portions of a one-directional thread corresponding to the threads of the base part and the part to be attached. The differential thread connector can be screwed on the small thread of the base part to a predetermined length, subsequently the part to be attached is screwed on the large thread of the differential thread connector until contact with the base part is reached, and the preliminary tightening is carried out in screw-in direction, and subsequently the differential thread connector is rotated in screw-out direction and the final tightening is carried out.

6 Claims, 7 Drawing Sheets

(56) References Cited

U.S. PATENT DOCUMENTS

| | | | | |
|---|---|---|---|---|
| 4,928,531 A | * | 5/1990 | Schult | F16B 35/00 |
| | | | | 411/107 |
| 5,333,978 A | * | 8/1994 | Rives | B60Q 1/0433 |
| | | | | 411/369 |
| 6,053,653 A | * | 4/2000 | Tanaka | F16B 5/0275 |
| | | | | 29/525.11 |
| 6,125,526 A | * | 10/2000 | Wierzchon | F16B 5/0275 |
| | | | | 29/525.02 |
| 8,771,362 B2 | * | 7/2014 | Isch | A61F 2/4014 |
| | | | | 623/19.14 |
| 2006/0001850 A1 | * | 1/2006 | Dekker | G03F 7/70833 |
| | | | | 355/53 |
| 2012/0032435 A1 | * | 2/2012 | Carcagno | E21B 17/0423 |
| | | | | 285/96 |
| 2013/0269170 A1 | * | 10/2013 | Goldberg | F16B 5/0275 |
| | | | | 29/525.02 |
| 2013/0272816 A1 | * | 10/2013 | Vilas | F16B 5/0275 |
| | | | | 411/429 |

\* cited by examiner

METHOD FOR TIGHTENING A THREAD JOINT

This application claims priority to European Patent Application EP17163298 filed on Mar. 28, 2017. This application is incorporated herein by reference as if fully set forth.

FIELD OF THE INVENTION

The invention relates to thread joints and can be used in mechanical engineering, equipment construction, the oil and gas industry and communal utility systems.

BACKGROUND OF THE INVENTION

There are various methods for tightening thread joints: tightening to a predetermined torque, tightening to a predetermined angle, tightening to the elastic limit, tightening in the range of plastic deformations and others.

A method for tightening thread joints is known (RU Patent 2025270, published Dec. 30, 1994) comprising the measuring of the bolting torque transmitted on the thread element, its unbolting torque, and the calculation of the amount of tightening force, characterised in that the tightening force is calculated and the amount of bolting and unbolting torque is measured. The amount of calculated tightening force is compared to a predetermined amount, the amount of its deviance from the predetermined amount is determined, based on it the required deflection angle of the thread element is calculated to provide the predetermined amount of tightening force, the thread element is rotated to that angle, and when there is no deviation of the amount of force from the predetermined one, a preliminary bolting torque is transmitted to it.

A shortcoming is the high complexity and amount of work required for carrying out the method, since the bolting torque and the unbolting torque have to be measured and the deflection angle of the thread element has to be calculated. The method can be employed in individual cases due to the technical specification of its implementation.

A method for tightening detachable thread joints is known (RU Patent 2105620, published Feb. 27, 1998) comprising the insertion of an intermediate tightening part between the parts to be connected, which can simultaneously function as a seal of the joint. The tightening part is cooled to a temperature significantly below that of the parts to be connected before it is positioned, subsequently it is positioned between the parts to be connected, and then it is preliminarily tightened, for instance with a thread joint. The final tightening of the joint is carried out by forces of thermal expansion corresponding to the increase of the temperature of the intermediate tightening part under the influence of the environment as its linear dimensions increase.

The increase of the linear dimensions of the tightening part is calculated depending on the required tightening force. The greater the required force, the more the size of the intermediate part must decrease during cooling. This can be achieved by several methods: decreasing the cooling temperature; using a material with a high linear expansion coefficient; increasing the size of the part, which has an influence on the tightening force.

A shortcoming of the method is the high complexity and the amount of work required for its implementation due to the necessity of cooling equipment and the insertion of an additional part into the thread joint. The method has a rather small range of applications due to the technical specification of its implementation.

A method for tightening thread joints is known (USSR Certificate of Authorship 795928, published Jan. 15, 1981) wherein to increase the accuracy of a tightening torque of the thread joint a preliminary rotation of one thread part in the elastic deformation zone is carried out, the rotating angle and the torque corresponding to that position as well as the torque at a subsequent loosening of the thread joint are measured, and the rotating angle of the thread part is determined, providing the required tightening torque as a relation of the product of the preliminary tightening angle, the thread pitch and the required tightening force to the product of the number K and the difference of the preliminarily applied torque and the torque during the subsequent loosening.

A shortcoming of the method is the high complexity and the amount of work required for its implementation due to the necessity to rotate the thread parts, to measure the angles and torques and do the calculations. The method can be applied in individual cases due to the technical specification of its implementation.

Also known is a number of pertinent inventions analyzed by the applicant: U.S. Pat. No. 4,790,703, JP 2010096210, DE 19503962, CN 202768602, KR 101052583.

The most pertinent technical solution is a method applied on a differential thread joint (see P. I. Orlov, *Osnovy konstruirovaniya. Spravochno*-metodicheskoye posobie. T2. "Mashinostroyenie", Moscow 1988). In this method a connector, namely a bolt with a differential thread, is used to join a base part and a part to be attached. On the bolt shaft two thread belts having a thread with the same direction are provided. The thread pitch of one belt is slightly larger than the thread pitch of the other belt. With the first thread belt the bolt is screwed into one of the parts to be tightened, and with the second it is simultaneously screwed into the other part. At one turn of the bolt the parts to be tightened approach each other to the amount of the difference of the pitches S2−S1. The bolt with the differential thread is equivalent to a regular threaded bolt with a very small pitch $\Delta S = S2 - S1$. The tightening can be carried out with a large force at a limited torque.

The shortcomings of this technical solution are the limited technical possibilities due to the simultaneous moving of the parts to be joined to a small amount, the poor coupling accuracy since no contact can be made in the predetermined place due to the constructive features of the parts, and also the poor reliability, since no strong tightening is possible due to the indeterminacy of the joining place of the parts.

SUMMARY OF THE INVENTION

The technical task of the invention is an increase in the reliability of a thread joint.

The technical result to be achieved is an increase in stability of the joint by means of increasing the tightening force of the parts to be attached.

The technical task is solved by a method for tightening a thread joint of a base part that has a small thread pitch and a part to be attached that has a large thread pitch by rotating a differential thread connector in screw-in direction having one-directional thread portions corresponding to the threads of the base part and the part to be attached, wherein the differential thread connector is screwed in to a predetermined length on the small thread of the base part, the part to be attached is screwed on the large thread of the differential thread connector into a contact with the base part, and a preliminary tightening is carried out in screw-in direction, subsequently the differential thread connector is rotated in screw-out direction, and the final tightening is carried out.

The comparison of the technical result according to the invention with the most pertinent prior art shows that it differs in the following features:
- the differential thread connector is screwed in to a predetermined length on the small thread of the base part;
- the part to be attached is screwed in on the large thread of the differential connector into a close contact with the base part, and a preliminary tightening in screw-in direction is carried out;
- the differential connector is rotated in screw-out direction, and a final tightening is carried out.

Hence it can be assumed that the technical solution according to the invention fulfils the novelty criterion.

The tightening of the thread joint is carried out in two stages: the preliminary tightening in screw-in direction of the differential thread connector and the final tightening in screw-out direction. The experiments we did show that when there is a difference of the pitches $S2-S1=\Delta S$, there is an increase of the axial tightening force while the torques of the preliminary and the final tightening are equal, i.e. $M2=M1$. The graph (FIG. 1) shows the relations of the axial force of the final tightening P1 to the axial force of the preliminary tightening P (P1/P) depending on the difference of the pitches $\Delta S=S2-S1$ of the thread for different values of the smaller pitches S1 and at constant tightening torque $M2=M1$, which corroborates the above results. Moreover due its constructive solutions the method according to the invention achieves an additional technical result associated with the exclusion of indeterminacy of the joining place of the parts to be joined.

The patent research did not reveal the entirety of the features of the invention achieving the technical result according to the invention, hence it can be assumed that the technical solution of the invention fulfils the criterion of involving an inventive step.

The parts to be joined can be formed with an outer or an inner thread. The contact surfaces of the parts to be joined can have different shapes: plane, conical, spherical etc.

The base part with the small pitch thread can be formed so that a portion of the small thread is limited by a ledge serving as a support during the screwing-in with the differential thread connector.

The differential thread connector can be formed as a sleeve, a coupling with a one-directional thread with various pitches, or as a differential thread shaft (screw, bolt, or pin).

In particular the differential thread connector can be formed as a sleeve with inner thread portions with a small pitch on one side and with a large pitch on the other side.

Or the differential thread connector can be formed as a shaft with portions having a small pitch thread and a large pitch thread.

Or the differential thread connector can comprise a shaft with portions having a small and a large one-directional thread and a stopper element screwed on the portion of the shaft with a large thread to a predetermined length.

The stopper element can be formed as a truncated cone with a conical surface, linked to a cone of the part to be attached, and with a thread aperture with a large thread pitch.

The stopper element can be formed as a nut with a plane surface, contacting the part to be attached by the plane, and with a thread aperture with a large thread pitch.

The essence of the technical solution according to the invention is explained by examples of specific embodiments without being limited to them.

DETAILED DESCRIPTION OF THE INVENTION

Figure 1:
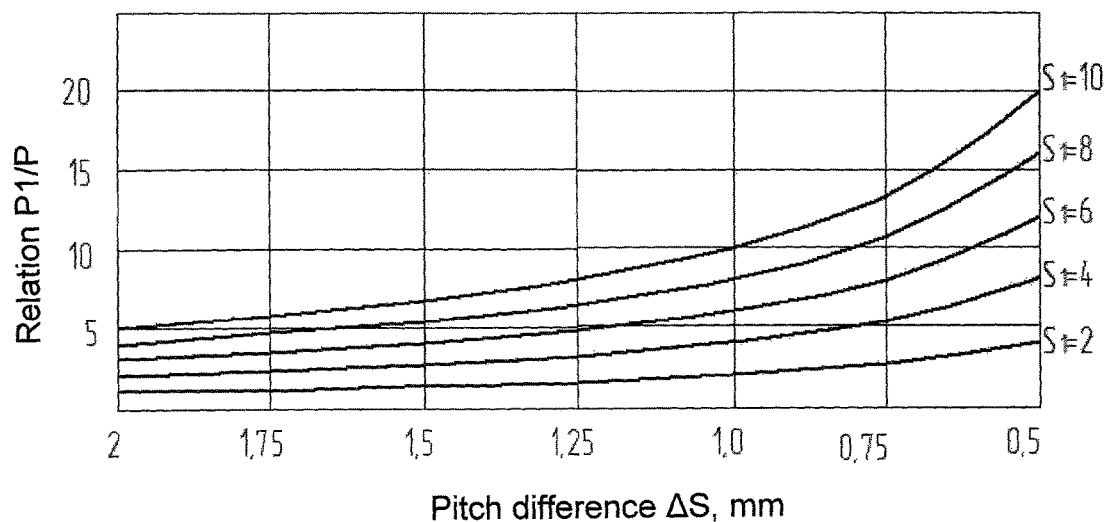
FIG. 1 is a graph of the dependence of the relation of the forces of the final and the preliminary tightening due to the difference of the thread pitches.
Figure 2:
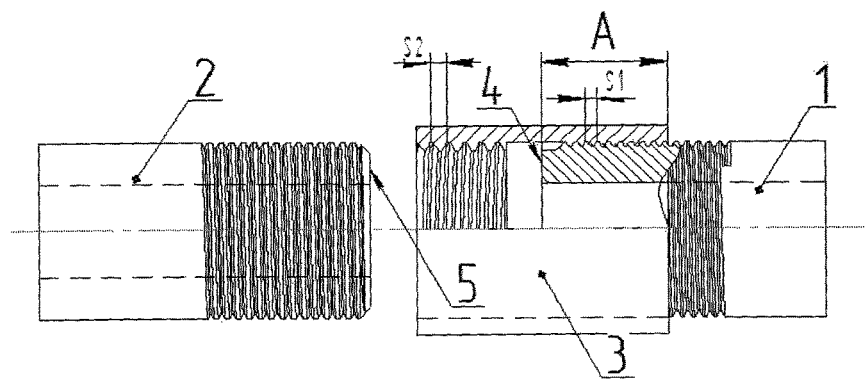
FIG. 2 shows the connection of the cylindrical parts by the differential thread connector formed as a sleeve in the initial position.
Figure 3:
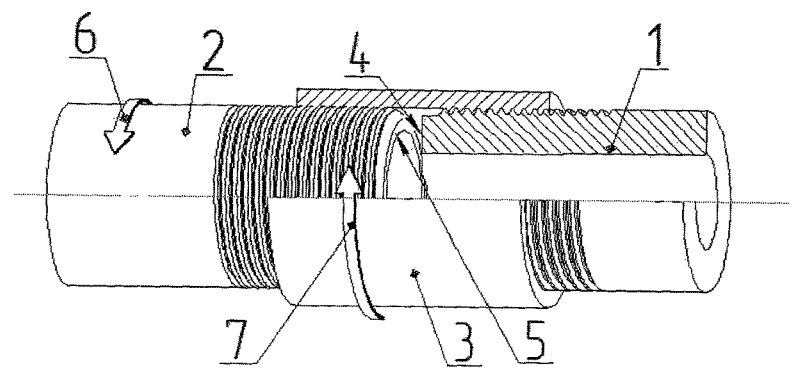
FIG. 3 shows the connection of the cylindrical parts by the differential thread connector formed as a sleeve during tightening of the joint.

Example 1 (according to the invention) shows a method for tightening two cylindrical parts. The cylindrical part 1 (FIG. 2) includes a threaded portion with a pitch S1 and a plane contact surface 4. On the cylindrical part 2 a threaded portion with a pitch S2 is arranged, and it comprises a plane contact surface 5. The thread pitch S2 is larger than the pitch S1 by an amount $\Delta S=S2-S1$. A differential thread connector 3 is formed as a coupling with inner thread portions having pitches S1 and S2. The method for tightening the thread joint is carried out as follows. A part 1 with a thread pitch S1 is screwed into a threaded aperture of the differential thread connector 3 to a predetermined length A. Subsequently a part 2 with a thread pitch S2 is screwed into a differential thread connector 3 (FIG. 3) from the opposite end until a tightening of the contact surface 5 of the part 2 with the contact surface 4 of the part 1 is achieved. In this position a preliminary tightening of the joint is carried out with a torque M1 in the direction of arrow 6 (in screw-in direction). Further, while keeping the part 2 immobile, the differential thread connector 3 is rotated along the arrow 7 (in screw-out direction), and the final tightening of the joint is done with a torque M2 M1.

Figure 4:
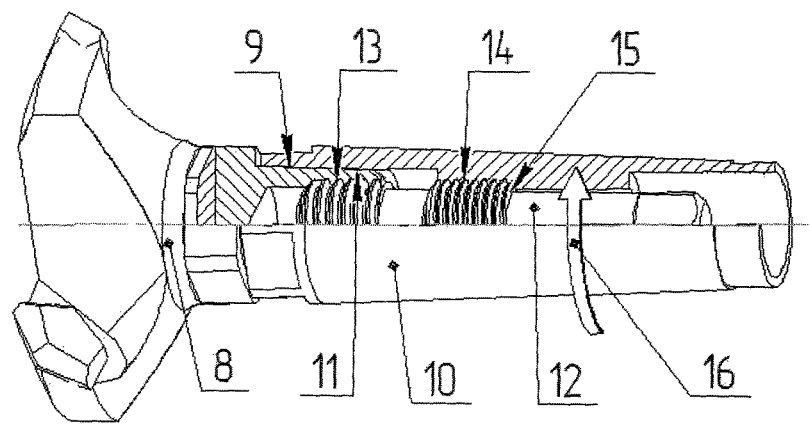
FIG. 4 shows the connection of the face cutter with a mandrel by the differential thread connector formed as a shaft.

Example 2 (according to the invention) shows a method for tightening a thread joint of parts with an inner thread (FIG. 4). For a thread joint of, for instance, a face cutter 8 with a large thread (the part to be attached) and a mandrel 10 with a small thread (the base part), formed in an aperture with a ledge, a differential thread connector formed as a shaft 12 with threaded portions having a large pitch 13 and a small pitch 14 are used. In the implementation of the method the differential thread connector 12 is screwed into a threaded aperture of a mandrel until the face 15 touches the corresponding ledge of the mandrel. Subsequently the cutter 8 is screwed onto the large-thread portion of the differential thread connector 12 until contact of the outer cone 9 with the cone 11 of the apparatus 12 is established, and the preliminary tightening is carried out with a torque M1 (in screw-in direction of the cutter). While the cutter 8 is kept in an immobile position, the differential thread connector 12 is rotated along the arrow 16 (in screw-out direction), and the final tightening is carried out with a torque M2.

Figure 5:
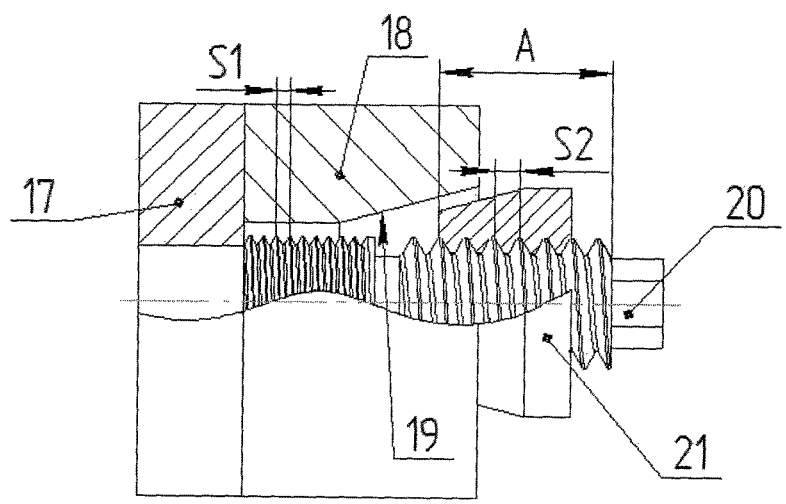
FIG. 5 shows the connection of the parts by the differential thread connector formed as a shaft with a conical stopper in the initial position.

Example 3 (according to the invention) shows a method for tightening a thread joint by means of a differential thread connector formed as a shaft with portions having a small and a large thread and provided with a stopper element, which can be used in assembling parts with apertures. The stopper element, for instance formed as a cone, provides a link of the differential thread connector with the part to be attached. In the aperture of the base part 17 (FIG. 5) a thread with a small pitch S1 is formed. The part 18 to be attached has a smooth cylindrical aperture and a cone 19. On the shaft formed as a differential thread connector formed as a screw 20 two threaded portions with a thread having a small pitch S1 and with a thread having a large pitch S2 are formed.

A stopper 21 is screwed on the threaded portion with the thread pitch S2. The stopper surface is conically shaped with an angle of conicity equal to the angle of conicity of the cone 19 of the part 18. The stopper is arranged at a predetermined distance A from the edge of the threaded portion.

Figure 6:
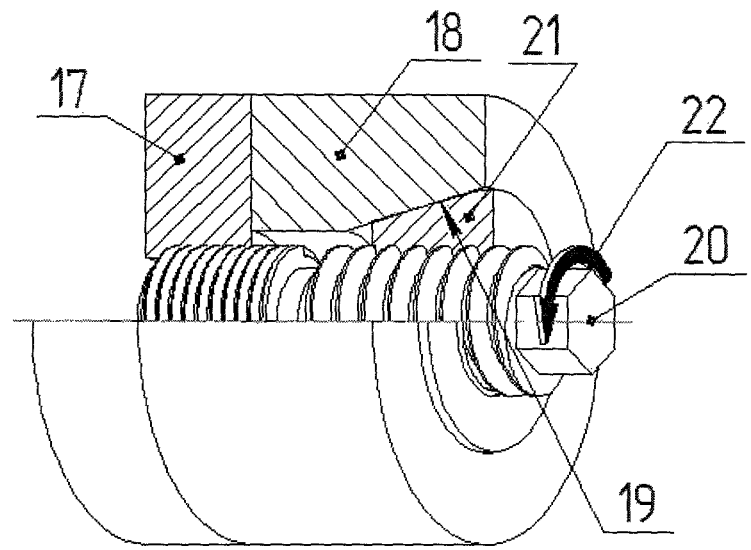
FIG. 6 shows the connection of the parts by the differential thread connector formed as a shaft with a conical stopper during the final tightening.

The method is carried out as follows. The differential thread connector 20 in its assembled state with the stopper 21 is screwed into the threaded aperture of the base part 17 (FIG. 6). When the conical surfaces of the part 18 to be attached and the stopper 21 abut, a preliminary tightening of the thread with a torque M1 is carried out in screw-in direction. As a result the fastening of the stopper in the aperture of the part takes place. Subsequently the differential thread connector 20 is rotated around the head along the arrow 22 (screw-out) and the final tightening of the thread is carried out with a torque M2.

The disassembly of the joint can be carried out when the conical coupling is released from the fastening by screwing out the stopper 21.

Figure 7:
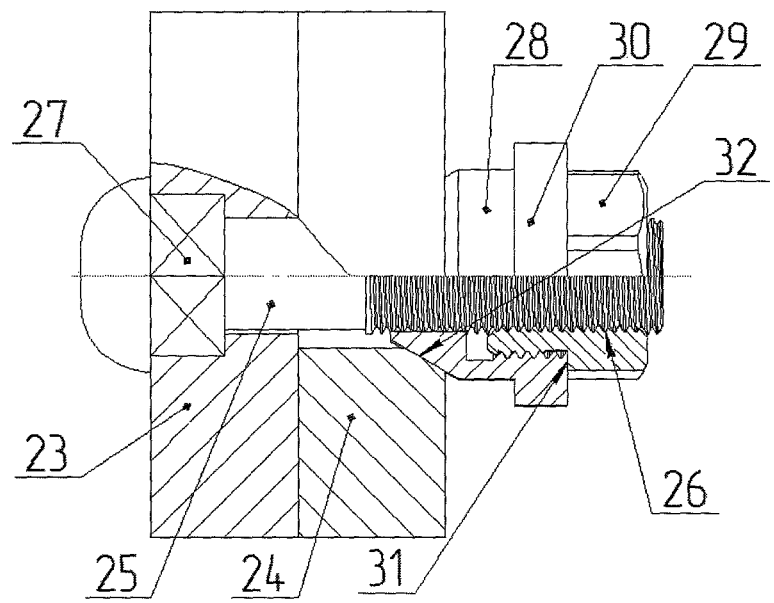
FIG. 7 shows the connection of the parts by a screw with an assembled construction thread connector.

Example 4 (according to the invention) shows a method for joining parts by means of a screw and a differential thread connector in an assembled construction (FIG. 7). The assembly consists of a base part 23, a part 24 to be attached, a screw 25 and a differential thread connector 29 formed as a sleeve. The screw 25 includes a portion 26 with a small thread and a profiled protrusion 27, for instance a square one, fixing the protrusion against rotation. In the part to be attached a cylindrical aperture with a cone 32 is provided. In the assembly a stopper 28 is used. The sleeve 29 has a small inner thread corresponding to the thread 26 of the screw 25, while on the outside a large thread is cut on the portion limiting a ledge 31. On the side of the outer face a hexahedral head is provided on the sleeve fitting a standard key applicable in the screwing in and the preliminary tightening of the thread joint. The stopper 28 with the large inner thread includes a cone and a portion 30 with a shaped profile on the outside to fit a special key required for loosening the conical coupling and screwing out the differential apparatus in the disassembling process. The stopper 28 is screwed in over the entire length of the large thread portion of the sleeve 29. The assembly and tightening of the joint is done as follows. The screw 25 is placed in the apertures of the base part 23, joining the profiled protrusion 27 with the corresponding socket of the base part 23. The differential thread connector 29 is screwed on the threaded portion 26 of the screw in its assembled state until contact of the conical surface of the stopper 28 with the conical aperture 32 of the part 24 to be attached is achieved. A preliminary tightening is carried out in screw-in direction with a torque M1, due to which the conical joint is fastened. The sleeve 29 is rotated in screw-out direction with a torque M2 M1 and a final tightening is carried out, providing a large axial tightening force. The friction torque caused by the fastening of the conical coupling prevents rotation and unscrewing of the stopper 28 and the sleeve 29 on the thread of the screw 25.

Figure 8:
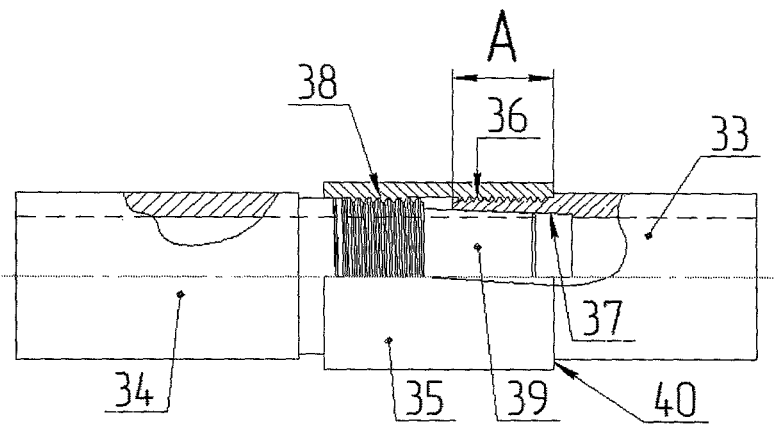
FIG. 8 shows the connection of pipes by a sleeve connector.

Example 5 (according to the invention) shows a thread joint of two pipes with a conical coupling. The assembly (FIG. 8) consists of a base pipe 33, a pipe 34 to be attached and a differential thread connector formed as a coupling 35. On the pipe 33 a threaded portion 36 with a small pitch thread and a conical aperture 37 are provided. The pipe 34 includes a threaded portion 38 with a large pitch thread and an inner cone 39 with a conicity corresponding to the conicity 37. The method for joining and tightening consists of the following. On a pipe 33 a coupling 35 is screwed to a coupling of a face 40 with a corresponding protrusion on the pipe 33. The position of the protrusion on the pipe is determined by the distance A from the face of the pipe. Subsequently the pipe 34 is screwed into the aperture of the coupling 35 to a tight coupling of the conical surface 39 of the pipe 34 with the conical aperture 37 of the pipe 33. A preliminary tightening is carried out (in screw-in direction) with a torque M1. Further, while preventing the pipe 34 from rotating, the coupling 35 is rotated in screw-out direction and a final tightening with a torque M2 is carried out.

Figure 9:
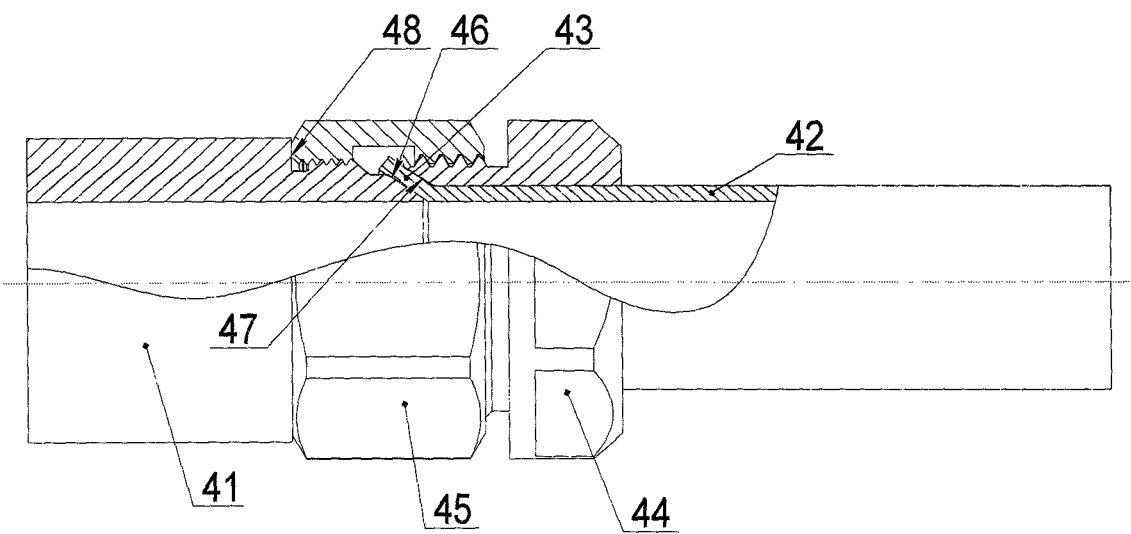
FIG. 9 shows the connection of a flared pipe with a connecting pipe having a sleeve connector.

Example 6 (according to the invention) shows a method for connecting a pipeline with a connecting pipe (FIG. 9). The assembly includes a connecting pipe 41 with a small thread (the base part), a pipe 42 with an end flared to a cone (the part to be attached), a nut 44 with a large thread and an inner cone 47, a differential thread connector 45 formed as a nut with a one-directional thread with a small and a large pitch. During assembly the nut 45 is screwed on the thread of the connecting pipe 41 until the face touches a protrusion 48. The pipe 42 is arranged coaxially with the connecting pipe 41 and the inner cone of the flare 43 is coupled to the outer cone 46 of the connecting pipe 41. The nut 44 is screwed into the threaded aperture of the nut 45 until a tight coupling of the cone 47 with the flare 43 of the pipe 42 is reached and is preliminarily tightened with a torque M1. While the nut 44 is kept immobile, the nut 45 is rotated in screw-out direction and the joint is finally tightened with a torque M2.

Figure 10:
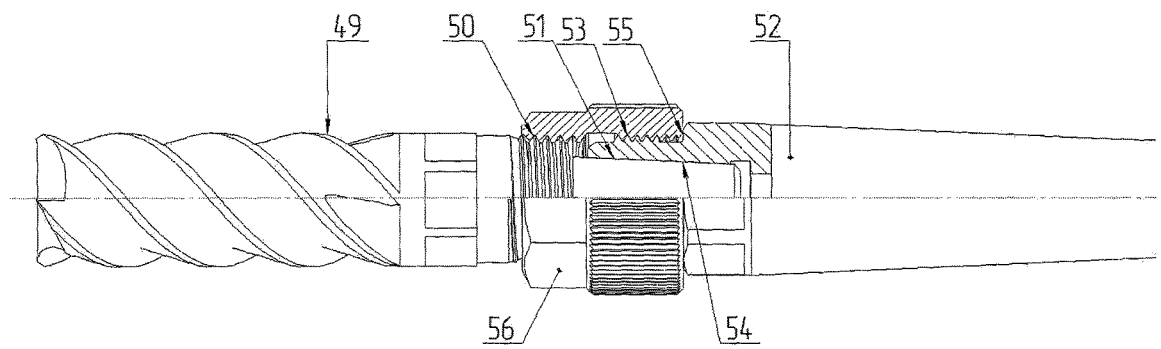
FIG. 10 shows the connection of the end cutter and the sleeve by means of a differential nut.

Example 7 (according to the invention) shows a method for fastening an axial cutting instrument, for instance an end cutter, in a mandrel (FIG. 10). The assembly consists of an end cutter 49 with a large thread portion 50 and an inner cone 51, a mandrel 52 with a small thread 53 and a conical aperture 54, and a differential thread connector formed as a nut 56. The method for tightening the joint is implemented as follows. The nut 56 is screwed on the thread 53 of the mandrel 52 until it touches the protrusion 55. The cutter 49 is arranged coaxially with the mandrel 52 and is screwed on the thread 50 into the threaded aperture of the nut 56 until tight coupling of the conical surfaces of the cutter and the mandrel is reached. The preliminary tightening is carried out (in screw-in direction) with a torque M1. During the preliminary tightening a reliable fastening of the conical coupling is reached. The final tightening with a torque M2 is realized by rotation of the nut 56 in screw-out direction.

Figure 11:
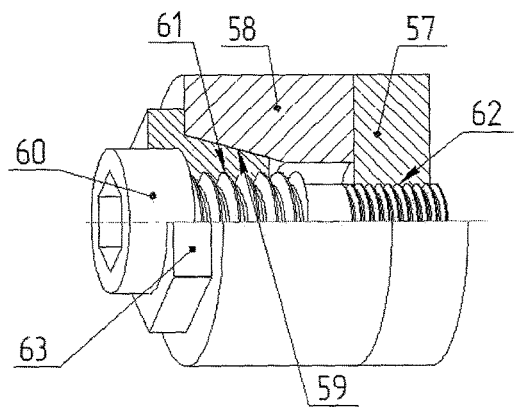
FIG. 11 shows the connection of two parts by the differential thread connector with the stopper.

Example 8 (according to the invention) shows a method for joining two parts using a conical stopper (FIG. 11). The base part 57 comprises a threaded aperture with a small thread 62. In the part 58 to be attached a conical aperture 59 is formed. The differential connector consists of a differential screw 60 and a stopper 63. The differential screw includes a small thread portion 62 and a large thread portion 61. The stopper 63 with a large inner thread, an outer cone and a hexahedral head fitting a key is screwed on the large thread portion 61 of the screw 60. The assembly and the tightening of the joint are carried out as follows. The differential screw 60 in assembled state with the stopper 63 is screwed into the aperture of the base part 57 until a tight coupling of the conical surfaces of the stopper 63 and the part 58 to be attached is reached. The preliminary tightening (in screw-in direction) is carried out with a torque M1. The final tightening is carried out rotating the screw 60 in screw-out direction with a torque M2. The disassembly of the joint can be done by screwing out the screw 60 together with the stopper 63 from the threaded aperture of the part 57 in a rotation around the hexahedral head of the stopper.

Figure 12:
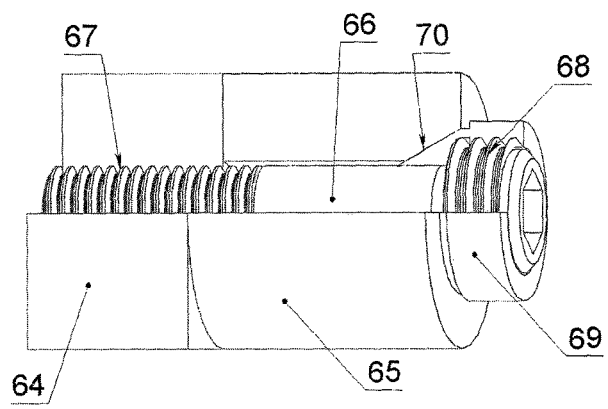
FIG. 12 shows the connection of two parts by the differential screw with the conical stopper.

Example 9 (according to the invention) shows a method for joining two parts using a conical stopper (FIG. 12). The base part 64 includes a threaded aperture with a small thread 67. In the part 65 to be attached a conical aperture is formed. A differential connector formed as a screw 66 has a small thread 67 at the shaft and a large thread 68 at the head. On the thread of the head 68 of the screw 66 the conical stopper 69 with the cone 70 is screwed corresponding to the cone of the aperture of the part 65 to be attached. The assembly and the tightening of the joint is carried out as follows. The screw 66 is screwed into the aperture of the base part 64 in an assembly with the stopper 69 until a tight coupling of the conical surfaces of the stopper 69 and the part 65 to be attached is reached. The preliminary tightening is carried out (in screw-in direction) with a torque M1. The final tightening is carried out during rotation of the screw 66 in screw-out direction with a torque M2.

Examples 8 and 9 (FIG. 12) can be realized in automatized assembly manufacturing using special impact wrenches. Impact wrenches carry out the screwing in of the differential connector together with the stopper, the preliminary tightening of the joint and the final tightening in screw-out direction.

Figure 13:
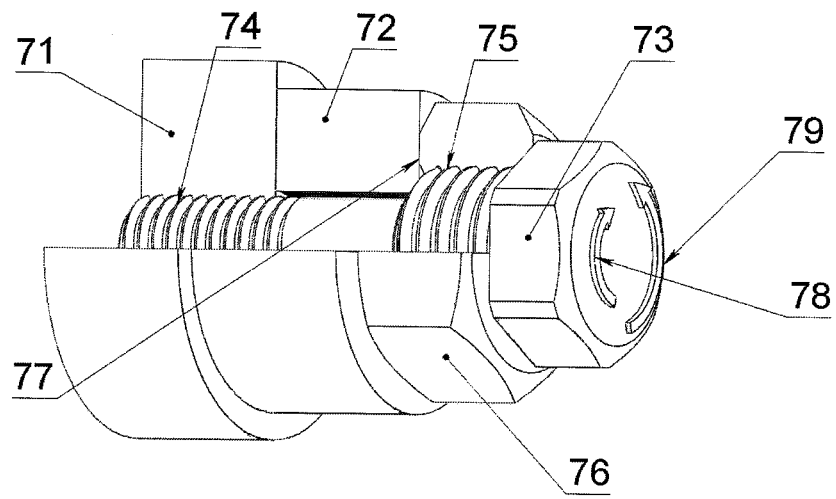
FIG. 13 shows the connection of two parts by a differential bolt with a stopper formed as a nut.

Example 10 (according to the invention) shows a method for joining parts by means of a connector with a stopper. The assembly (FIG. 13) consists of a base part 71, a part 72 to be attached, and a differential thread connector formed as a screw 73. The screw 73 includes a portion 74 with a small thread and a portion 75 with a large thread. A stopper 76 formed as a nut is screwed on the large thread portion. The assembly of the joint and the tightening are carried out as follows. The screw 73 together with the nut 76 is screwed on the small thread 74 into the base part until tight contact of the face 77 of the nut with the plane of the part 72 to be attached is reached, and the preliminary tightening is carried out in the direction of the arrow 78 with a torque M1. While the nut 76 is prevented from rotation, the final tightening is carried out with a torque M2 in the direction of the arrow 79 (in screw-out direction).

Figure 14:
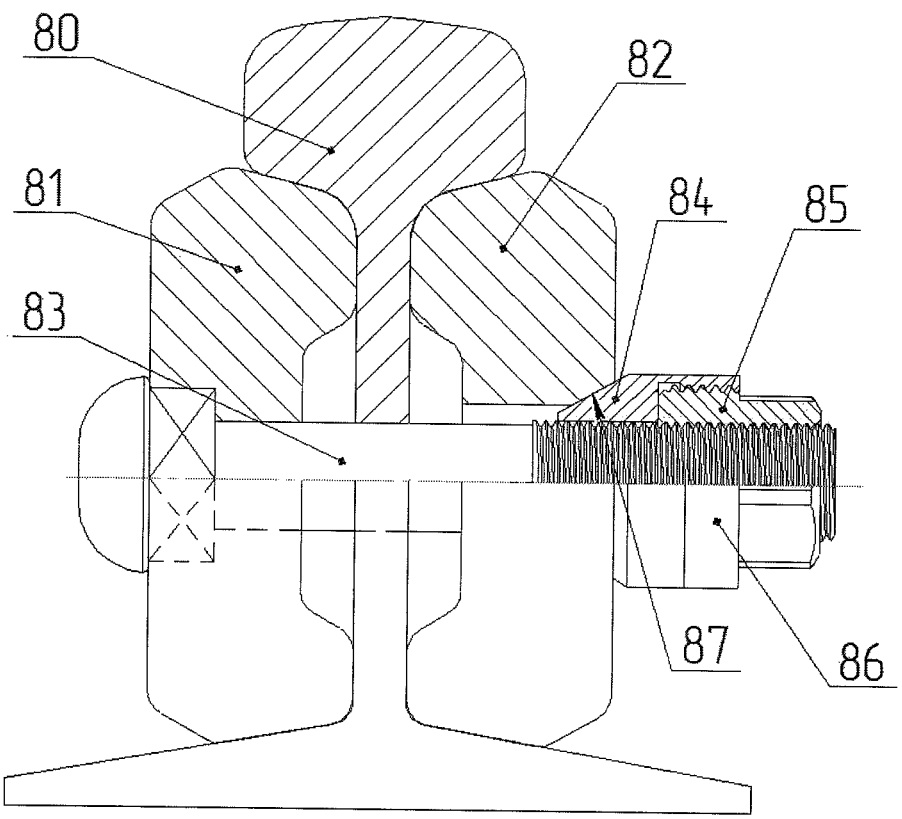
FIG. 14 shows the fastening of railway rails by a screw with an assembled construction differential connector.

Example 11 (according to the invention) shows a method for joining parts of a rail fastening by means of a screw and a stopper (FIG. 14). The assembly consists of a rail 80 and standard parts: a left clamp 81, a right clamp 82 and a screw 83 fixed against rotation in the clamp 81 by means of a profiled protrusion coupled with a corresponding socket of the base part 81. A differential connector comprises a sleeve 85 and a stopper 84. The sleeve has a small inner thread corresponding to the thread of the screw 83, while a large thread is cut on the outside. In an assembled state of the connector the stopper 84 is screwed onto the entire length of the large thread portion of the sleeve 85 until tight contact of the face planes is reached. A hexahedral head fitting a standard key is provided on the outside on the sleeve, applicable for the screwing in and the preliminary tightening of the thread joint. The stopper 84 with the large inner thread comprises a cone and a portion 86 with a shaped profile on the outside fitting a special key. The assembly and tightening of the joint are carried out as follows. The screw 83 is inserted into the aperture of the clamp 81, joining the profiled protrusion with a corresponding socket in the base part. On the threaded portion of the screw 83 a differential connector is screwed on in the assembled state until contact of the conical surface of the stopper 84 with the conical aperture 87 of the part 82 to be attached is reached. The preliminary tightening is carried out in screw-in direction with a torque M1. Subsequently the sleeve 85 is rotated around the hexahedral head in screw-out direction with a torque M2, and the final tightening is carried out.

The disassembly is carried out with a special key whose profile corresponds to the profile of the portion 86 of the stopper 84. When the special key is turned in screw-out direction, there is a loosening of the conical coupling 87 and a shift of the differential apparatus along the thread of the screw 83.

Figure 15:
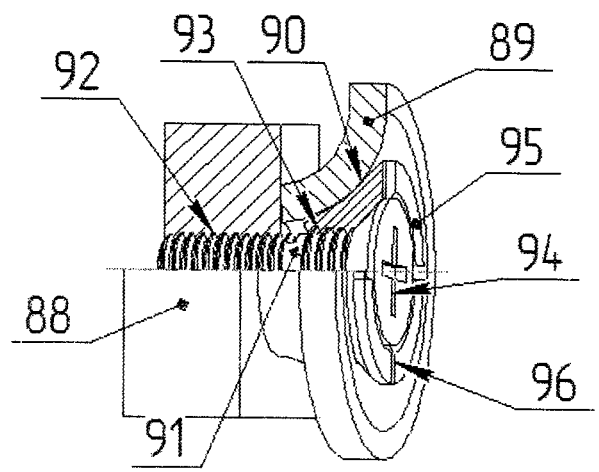
FIG. 15 shows the connection of parts of sheet material and a base part by a differential screw with a stopper.

Example 12 (according to the invention) shows a method for joining two parts using a special stopper (FIG. 15). The base part 88 has a threaded aperture with a small thread. The sheet material part 89 to be attached has flanged apertures 90 in the place of the thread joint. A differential apparatus consists of a differential screw 91 and a stopper 94. The differential screw includes a portion 92 with a small thread and a portion 93 with a large thread. On the face of the conical head of the screw crosswise recesses 94 are provided to fit a screwdriver used in the assembly of the joint. The stopper 95 has a large inner thread. The outer concave surface is formed as a coupling of two cones. The assembly and tightening of the joint are carried out as follows. The differential screw 91 in assembly with the stopper 95 are screwed into the aperture of the base part 88 until a tight coupling of the two conical surfaces of the stopper 95 with the curved surface 90 of the flanged aperture is reached. The preliminary tightening is carried out (in screw-in direction) with a torque M1. The final tightening is carried out during rotation of the screw 91 in screw-out direction with a torque M2. The disassembly of the joint is carried out by screwing out the screw 91 with the stopper 95 from the threaded aperture of the part 88 with a special screwdriver through slots 96.

The described method can be realized in automatized assembly manufacturing using a special impact wrench. The impact wrench carries out the screwing in of the differential connector together with the stopper, the preliminary tightening of the joint and the final tightening in screw-out direction.

Figure 16:
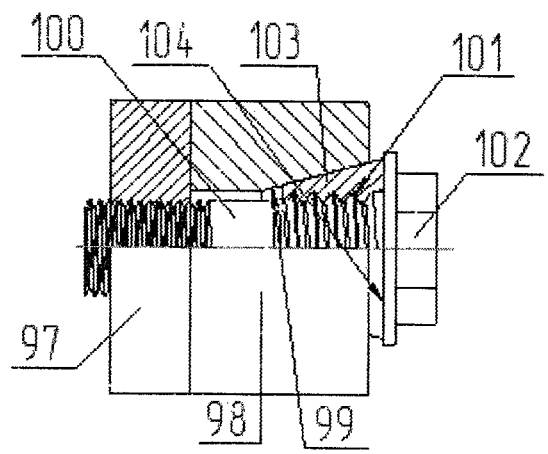
FIG. 16 shows a non-detachable thread connection of parts by a differential screw with a stopper.

Example 13 (according to the invention) shows a method for joining parts by means of a differential apparatus with a stopper. The assembly (FIG. 16) consists of a base part 97, a part 98 to be attached, and a differential apparatus formed as a differential screw with a stopper. In the part to be attached a conical aperture 99 is provided. A differential screw 100 comprises a portion with a small thread, a portion 101 with a large thread and a hexahedral head 102 fitting a wrench. A stopper 103 with a conical outer surface is screwed onto the large thread portion until it abuts the face 104 of the screw. The assembly of the joint and the tightening are carried out as follows. A differential screw 100 is screwed on the small thread into the base part 97 together with the stopper 103 until tight contact of the coupling of the cone of the stopper 103 with the conical aperture 99 of the part 98 to be attached is reached, and the preliminary tightening in screw-in direction is carried out with a torque M1. By turning the screw 100 around the head 102 in screw-out direction, the final tightening is carried out with a torque M2.

The obtained joint is of a non-detachable construction and is equivalent to a threaded rivet. The conical aperture 99 and the stopper 103 limit the shifting of the differential apparatus in screw-in direction, the difference in the pitches of the large and the small thread prevent its unscrewing.

The invention claimed is:

1. A method for tightening a thread joint of a base part that has a small thread pitch and a part to be attached that has a large thread pitch, the method comprising:
   rotating a differential thread connector in screw-in direction having one-directional thread portions corresponding to the threads of the base part and the part to be attached, the differential thread connector comprising a shaft with portions having a small and a large one-directional thread and a stopper element screwed on the large thread portion of the shaft to a predetermined length,
   wherein the differential thread connector is screwed in to a predetermined length on the small thread of the base part, wherein the part to be attached is screwed on the large thread of the differential thread connector up to a contact with the base part, and wherein the preliminary tightening is carried out in screw-in direction, subsequently the differential thread connector is rotated in screw-out direction, and the final tightening is carried out.

2. The method of claim 1, wherein a portion of the base part with the small pitch thread is formed so that a support can be provided during its screwing-in with the differential thread connector.

3. The method of claim 1, wherein the differential thread connector is formed as a sleeve with inner thread portions with a small pitch on one side and a large pitch on the other side.

4. The method of claim 1, wherein the differential thread connector is formed as a shaft with portions having a small pitch thread and a large pitch thread.

5. The method of claim 1, wherein the stopper element is formed as a truncated cone with a conical surface coupled to a cone of the part to be attached and a threaded aperture with a large thread pitch.

6. The method of claim 1, wherein the stopper element is formed as a nut with a plane surface contacting the plane of the part to be attached and a threaded aperture with a large thread pitch.

* * * * *